United States Patent [19]

Joshi et al.

[11] Patent Number: 5,254,230

[45] Date of Patent: Oct. 19, 1993

[54] METHODS FOR PREPARING BASIC ALUMINUM COMPOUNDS WITH ULTRASOUND

[75] Inventors: Vijay K. Joshi; Jawahar C. Parekh, both of Livingston, N.J.

[73] Assignee: Reheis, Inc., Berkeley Heights, N.J.

[21] Appl. No.: 916,299

[22] Filed: Jul. 17, 1992

[51] Int. Cl.$^5$ .................................. C01B 7/00
[52] U.S. Cl. ........................... 204/157.42; 204/157.48
[58] Field of Search ..................... 204/157.42, 157.48

[56] References Cited

U.S. PATENT DOCUMENTS

| | | | |
|---|---|---|---|
| 1,939,712 | 12/1933 | Mahoux | 143/10 |
| 3,346,472 | 10/1967 | Long | 204/157.1 |
| 3,630,866 | 12/1971 | Pelofsky | 204/157.1 |
| 3,873,686 | 3/1975 | Beekman | 424/47 |
| 3,891,745 | 6/1975 | Bellan et al. | 423/462 |
| 3,904,741 | 9/1975 | Jones et al. | 423/462 |
| 4,359,456 | 11/1982 | Gosling et al. | 424/68 |
| 4,466,870 | 8/1984 | Boudjouk et al. | 204/158 |
| 4,859,446 | 8/1989 | Abrutyn et al. | 423/462 |
| 4,944,933 | 7/1990 | Inward | 423/462 |

FOREIGN PATENT DOCUMENTS

| | | |
|---|---|---|
| 0006739 | 1/1980 | European Pat. Off. . |
| 0191628 | 8/1986 | European Pat. Off. . |
| 0256831 | 2/1988 | European Pat. Off. . |
| 0274252 | 7/1988 | European Pat. Off. . |
| 0285282 | 10/1988 | European Pat. Off. . |
| 0183171 | 3/1990 | European Pat. Off. . |
| 3806862 | 8/1961 | Japan . |

*Primary Examiner*—John Niebling
*Assistant Examiner*—C. Delacroix-Muirheid
*Attorney, Agent, or Firm*—Panitch Schwarze Jacobs & Nadel

[57] ABSTRACT

Processes are provided for preparing basic aluminum compounds of Formula I:

$$Al_2(OH)_{6-a}X_a \qquad (I)$$

wherein X is $Cl^-$, $Br^-$, $F^-$, $I^-$, $SO_4^=$ or $NO_3^-$ and a is about 0.9 to 4, the compound being characterized by size exclusion chromatography as having a Band I percent aluminum value of about 5% or less and a Band II percent aluminum value of about 50% to 90%, which comprise (a) suspending an aluminum metal in an aqueous medium to form a slurry, (b) applying ultrasonic energy to the slurry, (c) reacting the sonicated slurry with an aluminum compound of Formula II $$Al_nX_m \qquad (II)$$

or an acid of Formula III:

$$H_nX \qquad (III)$$

wherein X is $Cl^-$, $Br^-$, $F^-$, $I^-$, $SO_4^=$ or $NO_3^-$, n is 1 or 2 and m is 3, at a temperature of about 45° C. to 100° C. to form a reaction product.

19 Claims, No Drawings

METHODS FOR PREPARING BASIC ALUMINUM COMPOUNDS WITH ULTRASOUND

FIELD OF THE INVENTION

The present invention relates to improved processes for the preparation of basic aluminum compounds. More particularly, the present invention relates to processes for preparing basic aluminum compounds with greater efficiency and which contain a lower ratio of higher molecular weight species.

BACKGROUND OF THE INVENTION

Basic aluminum compounds, particularly aluminum chlorhydroxides, are conventionally prepared by dissolving aluminum powders, grits, chips or bars in heated solutions of aluminum chloride or hydrochloric acid. U.S. Pat. No. 2,196,016 discloses an example of such a process. Other variations of this process are disclosed for example in U.S. Pat. Nos. 3,891,745; 4,944,933; 3,953,584; 3,957,556; 3,904,741 and 3,873,686.

However, such conventional processes for the preparation of basic aluminum compounds are known to produce a large percentage of high molecular weight species. When analyzed by size exclusion chromatography, in particular high pressure liquid chromotography (HPLC), such compounds are characterized as having a high Band I percent aluminum value. Generally, basic aluminum compounds comprising a high percentage of high molecular weight species are disadvantageous, as they demonstrate relatively lower antiperspirant efficacy than products containing a relatively higher percentage of lower molecular weight species.

Accordingly, various methods have been proposed to prepare so-called "activated" basic aluminum compounds having low amounts of high molecular weight species and which, when analyzed by size exclusion chromatography, demonstrate high Band II and Band III values. Examples of such methods are disclosed in U.S. Pat. Nos. 4,359,456 and 4,859,446; European patent Nos. 0 006 739; and 0 183 171; and European published applications Nos 0 191 628; 0 256 831; 0 274 252 and 0 285 282.

The use of ultrasonic energy to activate and/or otherwise improve chemical reactions is generally known in the chemical arts. For example, U.S. Pat. No. 4,466,870 discloses a method of promoting chemical changes comprising subjecting chemical reactants to ultrasonic energy as a treatment step. Several specific reactions are disclosed for the production of organic compounds in which ultrasonic energy is used to accelerate the disclosed reaction. U.S. Pat. No. 3,346,472 describes a method of manufacturing chemical components, particularly polymeric foams, comprising controlling the chemical reaction and/or polymerization with the use of sonic or supersonic frequencies. In this method, the chemical mixture is passed into contact with first and second vibrating walls during the reaction.

Moreover, U.S. Pat. No. 3,630,866 discloses the improvement of chemical reactions, particularly intramolecular reactions, by subjecting fluid reactants to ultrasonic energy. Japanese Patent 38-6862 broadly discloses the concept of activating aluminum through the application of ultrasonic energy. This reference requires the sonication of aluminum in an inert, non-aqueous medium or in vacuo. U.S. Pat. No. 1,939,712 teaches activation of metal surfaces by ultrasound treatment for purposes of surface hardening, nitriding, cementation, etc.

However, none of these references discloses or suggests the use of ultrasonic energy to prepare basic aluminum compounds having low amounts of high molecular weight species and a majority of low molecular weight species.

SUMMARY OF THE INVENTION

Accordingly, it is an object of the present invention to provide processes for producing basic aluminum compounds having low amounts of high molecular weight species and a majority of relatively lower molecular weight species, thus having increased antiperspirant efficacy. It is a further objective of the present invention to provide processes which will produce basic aluminum compounds at an improved rate in comparison to conventional processes.

According to the present invention, there are provided processes for preparing basic aluminum compounds of Formula I:

$$Al_2(OH)_{6-a}X_a \qquad (I)$$

wherein X is $Cl^-$, $Br^-$, $F^-$, $I^-$, $SO_4^=$ or $NO_3^-$ and a is about 0.9 to 4, the preferred 5/6 basic compounds being characterized by size exclusion chromatography (HPLC) as having a Band I aluminum value of about 5% or less and a Band II aluminum value of about 50% to 90%. The process comprises (a) suspending aluminum metal in an aqueous medium to form a slurry, (b) applying ultrasonic energy to the slurry, and (c) reacting the sonicated slurry with an aluminum compound of Formula II:

$$Al_nX_m \qquad (II)$$

or an acid of Formula III:

$$H_nX \qquad (III)$$

wherein X is $Cl^-$, $Br^-$, $F^-$, $I^-$, $SO_4^=$ or $NO_3^-$, n is 1 or 2 (depending on the valence of X) and m is 3, at a temperature of about 45° C. to 100° C. to form a reaction product. Preferably, the processes also include (d) filtering the product solution to remove unreacted aluminum, and (e) drying the product solution to remove essentially all free water, forming a solid.

DETAILED DESCRIPTION OF THE INVENTION

The present process is directed to the preparation of basic aluminum compounds which preferably contain 5% or less of higher molecular weight aluminum (i.e., Band I) species. It has been found that the present process may proceed in shorter times, at lower temperatures and using lower grade aluminum than is possible with conventional processes for the preparation of aluminum compounds. In fact, it has been found that the processes of the present invention take at least 25% less time to complete in comparison to conventional processes.

The basic aluminum compounds which are the reaction product of the process of the present invention can be represented by Formula I:

$$Al_2(OH)_{6-a}X_a \qquad (I)$$

In Formula I, X is represented by $Cl^-$, $Br^-$, $F^-$, $I^-$, $SO_4^=$ or $NO_3^-$. Preferably, X is $Cl^-$ or $Br^-$, and more preferably X is $Cl^-$. In Formula I, a is about 0.9 to 4, and preferably about 0.9 to 1.2 (i.e., 5/6 basic aluminum chloride or bromide). It will be understood by those skilled in the art that the above formula is greatly simplified and is intended to encompass basic aluminum compounds containing coordinated or bound molecules of water, as well as basic aluminum polymers, complexes and mixtures of the above, e.g. products with different distributions of molecular weight species.

The 5/6 basic aluminum compounds of Formula I may be characterized by size exclusion chromatographic (HPLC) analysis as having a Band I percent aluminum value of about 5% or less and a Band II percent aluminum value of about 50% to about 90%. Preferably, the Band II value is about 70% to about 90%. The compounds of Formula I may be characterized using conventional size exclusion chromatographic techniques which will be evident to those skilled in the art from the present disclosure. An example of a satisfactory system useful for analyzing the present compounds by HPLC and used in the following examples is a MAXSIL 5 RP-2 chromotographic column manufactured by Phenomenex of Torrance, Calif., using 10mM nitric acid as the mobile phase, and a chromotographic apparatus supplied by Waters Division of Millipore Corporation of Milford, Mass.

In the basic aluminum compounds prepared with the process of the present invention, the majority of the aluminum is present as the lower molecular weight, Band II and Band III species. Moreover, the present process provides basic aluminum compounds having about 5% or less of the high molecular weight, i.e., Band I, aluminum species. Due to the presence of a high proportion of lower molecular weight species, the products of the present process are expected to demonstrate excellent antiperspirant activity (i.e., sweat reduction).

The present process comprises suspending an aluminum metal in an aqueous medium to form a slurry. The form of metallic aluminum useful in the present process is not limited. For example, any of aluminum powder, flakes, shot, wire, etc., may be used as the aluminum metal component of the present process. Although the form of the metallic aluminum is not limited, aluminum powder is preferred. An example of aluminum powder suitable for use in the present process is AMPAL 601 TM sold by Ampal, Inc. of Flemington, N.J., having not less than 35% of particles thru 325 mesh and 100% thru 40 mesh (425 microns). Moreover, it is not required that the aluminum metal be pure or finely divided, but rather, even scrap or recycled aluminum is suitable for use in the present process. The use of appropriate aluminum metals for specific applications will be evident to one skilled in the art based upon the present disclosure.

The slurry of the aluminum metal and the aqueous medium should contain about 10 to about 50 weight percent and preferably about 30 to about 40 weight percent of the aluminum metal. The slurry may be prepared in any manner which will be evident to one skilled in the art in view of the present disclosure. During preparation, the slurry may be agitated in order to hasten its formation, although such agitation is not required.

Once formed, ultrasonic energy is applied to the slurry. It has been found that successful results can be obtained from the present process irrespective of the frequency and intensity of the ultrasonic energy applied to the slurry. However, it is preferred that the ultrasonic energy be applied to the slurry at a constant frequency of about 15 kHz to about 10 MHz and more preferably, about 20 kHz or less. Intensity is the measure of amplitude of ultrasonic vibration at the tip of the disruptor. Intensity numbers are relative and refer to settings on the instrument (viz. from 1 to 10). It does not have any specific units. The intensity setting of the instrument could be anywhere from 1 to 10 and preferably about 2 to 5.

The application of the ultrasonic energy should be maintained for a period of time sufficient to activate the aluminum. Generally, the ultrasonic energy is applied to the slurry for about 15 to 60 minutes, preferably about 15 to 30 minutes, and more preferably about 30 minutes (all at 20 kHz). However, it will be understood that the period of time necessary to activate the aluminum is generally variable dependant upon the frequency of the ultrasonic energy applied, the temperature of the slurry, and the form of aluminum used.

During application of the ultrasonic energy, the slurry should be maintained at a constant temperature of about 8° to 50° C. and preferably about 10° C. Much higher temperatures (i.e., greater than 50° C.) appear to hasten deactivation of the aluminum. It is preferred that during sonication, the temperature variation be about ±5° C. and preferably ±1° C.

The sonicated slurry is then reacted with an aluminum compound of Formula II:

$$Al_n X_m \qquad (II)$$

or an acid of Formula III:

$$H_n X \qquad (III)$$

wherein X is $Cl^-$, $Br^-$, $F^-$, $I^-$, $SO_4^=$ or $NO_3^-$, n is 1 or 2 depending on the valence of X and m is 3. These components are reacted at a temperature of about 45° C. to about 100° C. and preferably about 90° to about 95° C., for a period of time sufficient to form the desired reaction product. Preferably, the aluminum slurry is reacted with aluminum chloride or hydrochloric acid.

One method of conducting this reaction is to decant the water from the sonicated slurry, such as with a siphon, to form a paste of the sonicated aluminum. The paste is then mixed with the compound of Formulas II or III in small increments. However, the sonicated slurry may be reacted with an aluminum compound of Formula II or an acid of Formula III in any appropriate manner as will be evident to one skilled in the art from the present disclosure. If the sonicated slurry is to be reacted with an aluminum compound of Formula II, the aluminum compound must be suspended or dissolved in an appropriate medium prior to reaction with the slurry. Appropriate media, as well as appropriate methods for dissolving or suspending said aluminum compounds in said media, will be evident to one skilled in the art based upon the present disclosure. However, it is preferred that the aluminum compound be dissolved or suspended in aqueous media prior to reaction with the sonicated slurry.

The sonicated slurry and the aluminum compound or acid should be reacted at a constant temperature of about 45° C. to about 100° C. and preferably about 90° C. to about 95° C. The reaction should be maintained for a period of time sufficient to form the desired reaction product. Appropriate methods for determining whether the desired amount of reaction product has been formed will be evident to one skilled in the art. However, generally, since the compounds are reacted in stoichiometric amounts, the reaction should be maintained until essentially no aluminum remains in the reaction mixture.

It is preferred that the sonicated slurry and the aluminum compound or acid be reacted for a period of time sufficient to form a reaction product having a ratio of aluminum to anion (Al/X molar ratio) of about 0.5:1 to 2.1:1. Preferably, the slurry and the aluminum compound are reacted for a period of time sufficient to form a reaction product having an Al/X molar ratio of about 1.9:1 to 2.1:1 is obtained. One skilled in the art will be able to determine that reaction products having such Al/X molar ratios have been achieved by, e.g., calculating the reaction ratios of aluminum metal and aluminum chloride ($AlCl_3$) or hydrochloric acid (HCl).

Generally, the time of this reaction will be about 4 to 6 hours and preferably about 5 hours. However, the reaction time will vary based upon the particular reactants, the type and amount of reaction product desired, as well as other variables, such as the final solid concentration of the products, the temperature of the reaction, etc., and thus, is not limited. Appropriate reaction times for a particular application will be evident to one of ordinary skill in the art based upon the present disclosure.

Alternatively, the slurry of aluminum metal can be mixed with the aluminum compound or acid and this mixture can be sonicated under the conditions set forth above.

Once the reaction of the sonicated slurry and the aluminum compound or acid is complete, the reaction product solution is preferably filtered to remove any remaining unreacted aluminum. The filtering may be accomplished in any manner suitable to remove the particular product prepared, such as by vacuum filtration. Appropriate filtering methods for particular applications will be evident to one of ordinary skill in the art based upon the present disclosure.

Once filtered from the reaction medium, the reaction product solution is then dried. It is preferred that the reaction product be dried to an extent sufficient to remove essentially all free water therefrom. Generally, any conventional drying method may be used in the present process. For example, spray drying, vacuum drying, processes comprising drying under atmospheric temperature and pressure, etc., may all be useful to dry the reaction products of the present process. However, from the viewpoints of economy and efficiency, it is preferred that the reaction products be spray dried. Preferably, the reaction products are dried in a spray drier at a temperature of about 80° to 115° C. and at a feed rate of about 95 ml/min.

The processes of the present invention will now be illustrated by reference to the following specific, non-limiting examples. Analysis percents are by weight unless otherwise indicated.

EXAMPLE 1

205 grams of Al powder AMPAL 601 TM were placed in a one liter beaker containing 800 grams of water forming a slurry. The slurry was then stirred at high speed and circulated through the flow cell of an ultrasound disruptor supplied by Heat Systems-Ultrasonics, Inc. of Farmingdale, N.Y.

The ultrasound disruptor used in the present examples, unless otherwise specified, comprises a built-in ultrasound source, consisting of a piezoelectric material such as lead, zirconate titanate ceramic (PZT) or quartz. In operation, the piezoelectric material is subjected to a high-voltage alternating electric current having an intensity of 1-10 and an ultrasonic frequency of about 15 kHz to 10 MHz. The piezoelectric source expands and contracts in this electric field and is attached to an amplifying horn of the ultrasonic disruptor. The ultrasonic disruptor used in all of the following examples had a constant frequency of 20 kHz.

The slurry was circulated through the disruptor for 1 hour at 10° C. to sonicate the slurry. Once sonication of the slurry was completed, the water was removed by decantation with a siphon, thus forming a paste.

A four liter beaker was then charged with 1040 grams of 24° Baume (Be) $AlCl_3$ and 753 grams of water. The mixture was stirred and heated to a temperature of 95° C. The temperature was maintained at 95° C. for the remainder of the reaction. The presonicated aluminum paste was then added to the beaker containing the $AlCl_3$ mixture in small increments over a period of two hours. At the completion of the reaction the liquid was filtered to remove unreacted aluminum, and the product solution was spray dried to remove essentially all of the free water. The composition of the powder was 24.5% Al, 17.1% Cl, Al/Cl atomic ratio 1.9/1. The reaction product was then characterized by HPLC using a MAXSIL 5 RP-2 column. This apparatus was used in all examples set forth herein. The numeric analysis of the chromatogram of the resulting product is set forth below.

|  |  | % Area of Peaks | | | | |
| --- | --- | --- | --- | --- | --- | --- |
|  | Reaction Time | I | II | III | IV | V |
| Sonicated | 4.75 hrs. | sh. | 85.7 | sh. | 8.5 | 2.1 |

EXAMPLE 2

A 4 liter beaker was charged with 102 grams of Al powder, 376 grams of 32° Be $AlCl_3$ and 1040 grams of water. The mixture was stirred and circulated through the flow cell of the ultrasound disruptor referred to in Example 1 for 45 minutes at an intensity setting of 8. The temperature of the mixture was increased to about 62° C. after sonication was stopped stirring was continued for 2 hours. Whenever the temperature of the reaction mixture dropped below 60° C., sonication was restarted in order to maintain the reaction. When the reaction was essentially complete, the liquid was filtered and characterized using HPLC. The numeric analysis of the chromatgram is set forth below.

|  |  | % Area of Peaks | | | | |
| --- | --- | --- | --- | --- | --- | --- |
|  | Reaction Time | I | II | III | IV | V |
| Sonicated | 6.3 hrs. | sh. | 45.2 | 41.2 | 5.6 | 4.5 |

EXAMPLE 3

51 grams of atomized Al powder (−4 mesh, +80 mesh) supplied by Reynolds Metals Co. of Louisville, Ky. was suspended in 200 g of water and maintained at 10° C. This slurry was sonicated for 30 minutes at an intensity setting of 3. 198 grams of 32° C. Be $AlCl_3$ and 251 grams of water were then placed in a beaker and heated to 95° C. The sonicated slurry was then added to the AlCl$_3$/water mixture in four equal increments. The reaction mixture was maintained at 95° C. and stirred. After 6.5 hours the liquid was filtered to remove unreacted aluminum. The chemical analysis of this solution was 9.25% Al, 7.14% Cl, 1.7:1 Al/Cl atomic (molar) ratio.

For comparison purposes the same reaction was run using unsonicated aluminum. The chemical analysis of this solution was 11.0% Al, 7.78% Cl, 1.85:1 Al/Cl atomic ratio. Both reaction products were then characterized by HPLC. The results of the analyses are set forth below:

|  | Reaction Time | % Area of Peaks | | | | |
|---|---|---|---|---|---|---|
|  |  | I | II | III | IV | V |
| Sonicated | 6.5 hrs. | — | 85.2 | — | 10.5 | 4.3 |
| Unsonicated | 8.83 hrs. | sh. | 73.5 | sh. | 9.6 | 4.6 |

EXAMPLE 4

51 grams of Al shots (−6 mesh, +20 mesh) supplied by Reynolds Metals Co. were suspended in 200 grams water and sonicated for 1 hour in the same manner as set forth in Example 3. 198 grams of 32° Be AlCl$_3$ and 251 grams of water were then placed in a separate beaker and heated to 95° C. The sonicated Al shots were then added to the beaker containing the AlCl$_3$ and water. The temperature of the mixture was maintained at 95° C. and constantly stirred. The reaction product was filtered to remove unreacted aluminum.

For comparison purposes, the same reaction was run using unsonicated aluminum. The chemical analyses of the two solutions are as follows:

|  | % Al | % Cl | Al/Cl atomic ratio |
|---|---|---|---|
| Sonicated | 10.4 | 7.8 | 1.74:1 |
| Unsonicated | 10.4 | 7.4 | 1.84:1 |

Both reaction products were characterized by HPLC. The results of the chromatograms are set forth below.

|  | Reaction Time | % Area of Peaks | | | | |
|---|---|---|---|---|---|---|
|  |  | I | II | III | IV | V |
| Sonicated | 6.75 hrs. | sh. | 85.5 | — | 9.4 | 4.5 |
| Unsonicated | 16.18 hrs. | sh. | 86.5 | — | 8.5 | 4.9 |

EXAMPLE 5

51 grams of Al powder (−100 mesh, +400 mesh) supplied by ALPOCO of West Midland, U.K. was sonicated in 200 grams of water in the same manner as discussed in Example 1. A beaker containing 198 grams of 32° Be AlCl$_3$ and 251 grams of water was then heated to 95° C. The entire sonicated slurry was added to the AlCl$_3$/water mixture in small increments over a period of one hour. The temperature of the mixture was maintained at 95° C. and constantly stirred. The final product was then filtered and spray dried. For comparison purposes, the same reaction was run using unsonicated aluminum. Chemical analyses of the products are as follows:

|  | % Al | % Cl | Al/Cl atomic ratio |
|---|---|---|---|
| Sonicated | 11.5 | 8.1 | 1.86:1 |
| Unsonicated | 11.2 | 7.96 | 1.85:1 |

The reaction products were characterized by HPLC. The results of the chromatograms are set forth below:

|  | Reaction Time | % Area of Peaks | | | | |
|---|---|---|---|---|---|---|
|  |  | I | II | III | IV | V |
| Sonicated | 2.42 hrs. | sh. | 81.6 | — | 9.2 | 4.0 |
| Unsonicated | 3.25 hrs. | sh. | 51.0 | 32.4 | 12.5 | 2.6 |

EXAMPLE 6

102 grams of aluminum (AMPAL 601 TM) and 400 grams of water were mixed together in a beaker to form a slurry. This slurry was stirred with a magnetic stirrer, and the temperature was maintained at 10° C.

The slurry was then circulated through a continuous flow cell Model 800B which was fitted on an ultrasonic disruptor with a ½ inch standard horn, which in turn was connected to a Sonicator Ultrasonic Processor Model W-385. All equipment was supplied by Heat Systems-Ultrasonics Inc. of Farmingdale, N.Y.

The slurry was sonicated at a frequency of 20 kHz and an intensity setting of 3 for 45 minutes. During sonication, the temperature of the slurry was maintained at 10±1° C. At the end of sonication, the water in the slurry was decanted with a siphon, forming a paste. The aluminum paste was then added in small increments over 0.75 hours to a beaker containing 379 grams AlCl$_3$ and 519 grams water which was heated to 90° C. The aluminum paste and the AlCl$_3$/water mixture was allowed to react for 2.5 hours.

For comparison purposes, this reaction was run using unsonicated aluminum powder. The reaction product of the sonicated aluminum powder and the AlCl$_3$ mixture was characterized by HPLC. The results of the chromatogram are set forth below.

|  | Reaction Time | % Area of Peaks | | | | |
|---|---|---|---|---|---|---|
|  |  | I | II | III | IV | V |
| Sonicated | 2.5 hrs. | sh. | 55.2 | 32.0 | 9.0 | 1.6 |
| Unsonicated | 3.5 hrs. |  |  |  |  |  |

Chemical analysis of the two solutions was as follows:

|  | % Al | % Cl | Al/Cl atomic ratio |
|---|---|---|---|
| Sonicated | 10.4 | 7.26 | 1.89:1 |
| Unsonicated | 10.85 | 7.60 | 1.88:1 |

EXAMPLE 7

(a) 41 grams of aluminum powder (AMPAL 601 TM) was mixed with 500 grams of water to form a slurry. The slurry was sonicated at a frequency of 20 kHz and an intensity setting of 5 using the ultrasonic disruptor described in Example 1. The sonication was continued for 30 minutes and the temperature of the slurry was maintained at 10° C. during sonication.

In a separate beaker, 147 grams of AlCl$_3$ was added to 1812 grams of water and stirred. This mixture was heated to 85° C. The decanted slurry of the sonicated aluminum powder was then added to the AlCl₃/water mixture in small installments over 0.7 hours. The reaction was maintained for 3.4 hours at a temperature of 90° C. At the end of the reaction, the resulting solution was filtered and spray dried to form a powder.

(b) 66 grams of aluminum powder (AMPAL 601 TM) was mixed with 500 grams water and sonicated as mentioned above. In a beaker, 221 grams of aluminum chloride was mixed with 1713 grams of water and stirred. The mixture was heated to 85° C. and the sonicated aluminum slurry was added in small increments over a period of 1.7 hour. The reaction was maintained at 90° C. for 4 hours, filtered, and spray dried.

(c) 82 grams of AMPAL 601 TM aluminum powder was sonicated as above. In a beaker, 294 grams of aluminum chloride and 1624 grams of water were heated to 85° C. The sonicated aluminum slurry was added in small increments over a period of 1.5 hours. After 5.7 hours, the solution was filtered and spray dried.

(d) 122 grams of AMPAL 601 TM aluminum powder was sonicated as above. The sonicated slurry of Al powder was added in small increments to a beaker containing 457 grams of aluminum chloride and 1421 grams of water, maintained at 90° C. over a period of 1.7 hour, filtered after 4.6 hours, and spray dried.

For purposes of comparison, these reactions were also run with unsonicated aluminum powder and the reaction times were compared as shown by Table I.

TABLE I

| Sample # | Solid Conc. % | Experimental Conditions | Reaction Time min. |
|---|---|---|---|
| (a) | 10 | Unsonicated | 250 |
|  |  | Sonicated | 205 |
| (b) | 15 | Unsonicated | 290 |
|  |  | Sonicated | 245 |
| (c) | 20 | Unsonicated | 295 |
|  |  | Sonicated | 240 |
| (d) | 30 | Unsonicated | 380 |
|  |  | Sonicated | 275 |

EXAMPLE 8

747 grams of 32° Be AlCl₃ solution and 1049 grams of water were placed in a 4 liter beaker containing a magnetic stirrer. The contents of the beaker were heated to 90° C.

205 grams of aluminum powder (AMPAL 601 TM) were suspended in 600 grams of water and sonicated at various intensities and durations as set forth in Table II below at a frequency of 20 kHz at 10° C. using the same apparatus as in Example 1.

The presonicated and decanted aluminum slurry was then added in small increments over 2.5 hours to the AlCl₃/water mixture. This mixture was then allowed to react while the temperature was maintained at 95° C. After completion of the reaction, the solutions were filtered to remove any unreacted aluminum. Chromatographic analyses (HPLC) of the solutions were then conducted.

For purposes of comparison, this reaction was also run with unsonicated aluminum (i.e., Sample Nos. 8 and 10). Chromatographic analyses we re also conducted on these reaction product solutions. The results of these analyses are set forth in Table II below. The designations "sh." in Table II mean that the particular peak indicated (i.e., I or III) appeared as a shoulder on the adjacent larger peak (i.e. Peak II). The shoulder indicates a relatively small amount of the species of that peak and a molecular weight closer in molecular weight to the species of Peak II.

As can be seen from the results set forth in Table II, the samples using sonicated aluminum (except for Sample 5 which was at low intensity for a very short time) demonstrate a significantly lower Band I percent aluminum value and a much higher Band II percent aluminum value in comparison to samples reacting unsonicated aluminum with the AlCl₃/water mixture. Moreover, the products of the present process are formed at a much faster rate, demonstrating a significant reduction in the time needed to complete the reaction in comparison to the conventional process using unsonicated aluminum.

The present invention may be embodied in other specific forms without departing from the spirit or essential attributes thereof and accordingly, reference should be made to the appended claims, rather than to the foregoing specification, as indicating the scope of the invention.

TABLE II

| Sample | Intensity | Time (min.) | Reaction Time | % Al | % Cl | Al:Cl Atomic | % Reduction in Reaction Time | % Area of Peaks | | | | |
|---|---|---|---|---|---|---|---|---|---|---|---|---|
|  |  |  |  |  |  |  |  | I | II | III | IV | V |
| 1 | 2 | 30 | 5.33 | 11.78 | 8.29 | 1.87 | 26.5 | sh. | 69.8 | 10.4 | 7.6 | 5.3 |
| 2 | 5 | 15 | 4.42 | 11.30 | 8.16 | 1.82 | 39.0 | sh. | 85.1 | 7.6 | 5.4 | 2.0 |
| 3 | 5 | 30 | 4.67 | 11.97 | 8.56 | 1.84 | 35.6 | sh. | 71.7 | 12.7 | 7.2 | 6.7 |
| 4 | 5 | 45 | 5.00 | 11.27 | 8.09 | 1.83 | 31.0 | sh. | 73.5 | 11.9 | 6.2 | 6.5 |
| 5 | 2 | 15 | 5.00 | 11.66 | 8.40 | 1.83 | 31.0 | 17.9 | 54.8 | 9.6 | 6.2 | 7.5 |
| 6 | 2 | 45 | 5.33 | 11.79 | 8.40 | 1.84 | 26.5 | sh. | 87.3 | sh. | 6.1 | 6.6 |
| 7 | 8 | 17 | 6.50 | 11.50 | 8.31 | 1.82 | 10.3 | sh. | 87.8 | sh. | 7.3 | 4.9 |
| 8 | 0 | 0 | 7.25 | 11.55 | 8.10 | 1.87 | — | 19.6 | 53.0 | 11.9 | 5.4 | 7.4 |
| 9 | 8 | 32 | 5.17 | 10.76 | 7.83 | 1.81 | 28.7 | sh. | 77.6 | 9.0 | 5.5 | 6.6 |
| 10 | 0 | 0 | 7.25 | 11.36 | 8.18 | 1.82 | — | 39.6 | 42.4 | 5.5 | 7.4 | 5.1 |

We claim:
1. A process for preparing basic aluminum compounds of Formula I:

$$Al_2(OH)_{6-a}X_a \qquad (I)$$

wherein X is $Cl^-$, $Br^-$, $F^-$, $I^-$, $SO_4^=$ or $NO_3^-$ and a is about 0.9 to 4, said compound being characterized by size exclusion chromatography as having a Band I percent aluminum value of about 5% or less and a Band II percent aluminum value of about 50% to about 90%, comprising (a) suspending aluminum metal in an aqueous medium to form a slurry, (b) applying ultrasonic energy to said slurry, (c) reacting said sonicated slurry with an aluminum compound of Formula II:

$$Al_nX_m \qquad (II)$$

or an acid of Formula III:

$$H_nX \quad (III)$$

wherein X is $Cl^-$, $Br^-$, $F^-$, $I^-$, $SO_4^=$ or $NO_3^-$, n is 1 or 2 and m is 3, at a temperature of about 45° C. to 100° C. to form a reaction product.

2. A process as in claim 1, wherein said slurry is maintained at a temperature of about 8° C. to about 50° C. during application of the ultrasonic energy.

3. A process as in claim 2, wherein said slurry is maintained at a temperature of about 10° C. during application of the ultrasonic energy.

4. A process as in claim 1, wherein said sonicated slurry is reacted with said aluminum compound at a temperature of about 90° C. to about 95° C.

5. A process as in claim 1, wherein said sonicated slurry and said aluminum compound are reacted for a period of time sufficient to form a reaction product having an atomic ratio of aluminum to anion of 0.5 to 2.1:1 is obtained.

6. A process as in claim 1, wherein X is $Cl^-$ or $Br^-$.

7. A process as in claim 6, wherein X is $Cl^-$.

8. A process as in claim 1, wherein X is $Cl^-$, a is about 0.9 to 1.2, and n is 1.

9. A process as in claim 1, further comprising drying said reaction product.

10. A process as in claim 1, wherein said Band II percent aluminum value is about 70% to 90%

11. A process as in claim 1, wherein said aluminum metal is in the form of powder, flakes, shot or 12. A process as in claim 1, wherein said slurry comprises 10 to 50 weight percent of said aluminum 13. A process as in claim 12, wherein said slurry comprises 30 to 40 weight percent of said aluminum 14. A process as in claim 1, wherein said ultrasonic energy is applied to said slurry at a frequency of about 15 kHz to 10 MHz.

15. A process as in claim 14, wherein said frequency is about 20 kHz.

16. A process as in claim 1, wherein said ultrasonic energy is applied to said slurry for 15 to 60 minutes.

17. A process as in claim 1, wherein said ultrasonic energy is applied to said slurry for 15 to 30 minutes.

18. A process as in claim 1, further comprising filtering the product solution.

19. A process as in claim 1, wherein said reaction product is spray dried.

* * * * *